March 13, 1951 R. D. HOTVEDT 2,544,836
COFFEE MAKING APPARATUS
Filed May 19, 1947 5 Sheets-Sheet 1

INVENTOR
RICHARD D. HOTVEDT
BY
J. H. Braddock
ATTORNEY

March 13, 1951  R. D. HOTVEDT  2,544,836
COFFEE MAKING APPARATUS
Filed May 19, 1947  5 Sheets-Sheet 2
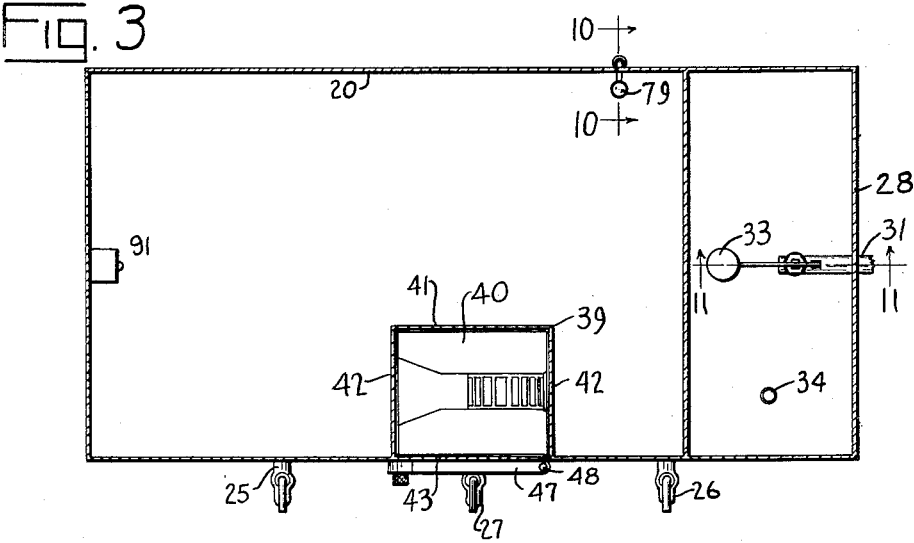
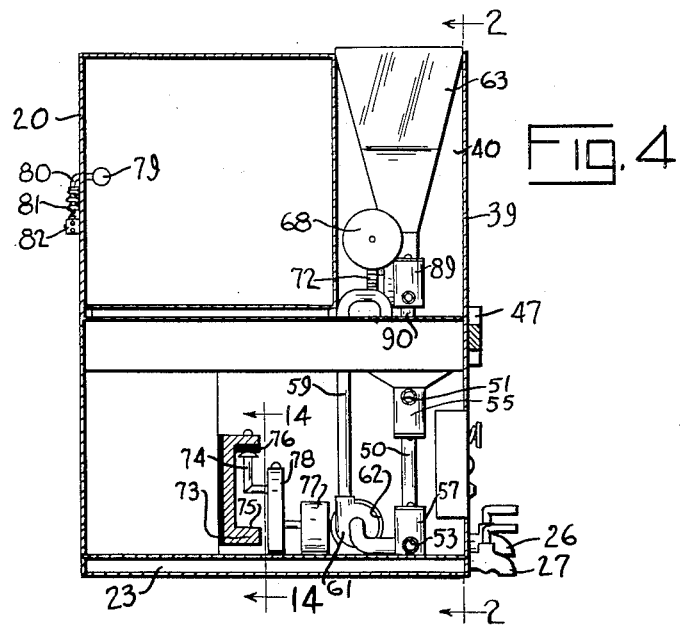
INVENTOR
RICHARD D. HOTVEDT
BY G. H. Braddock
ATTORNEY March 13, 1951 R. D. HOTVEDT 2,544,836
COFFEE MAKING APPARATUS
Filed May 19, 1947 5 Sheets-Sheet 3
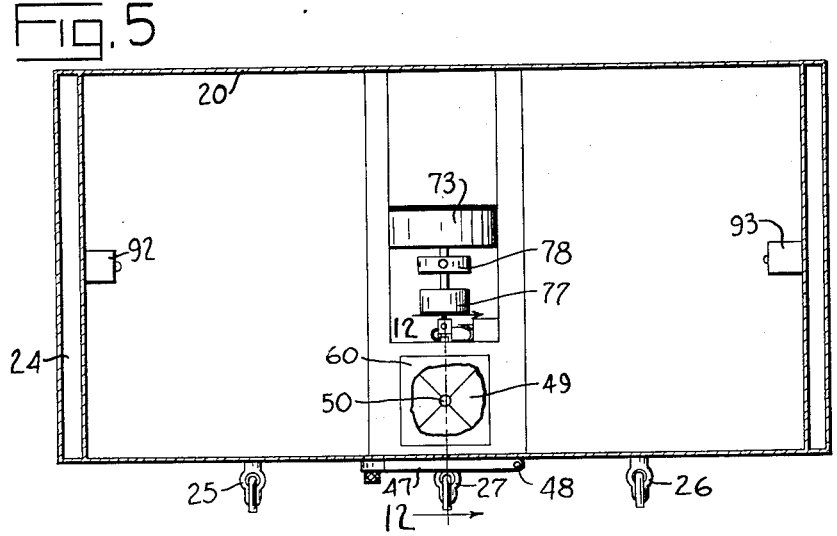
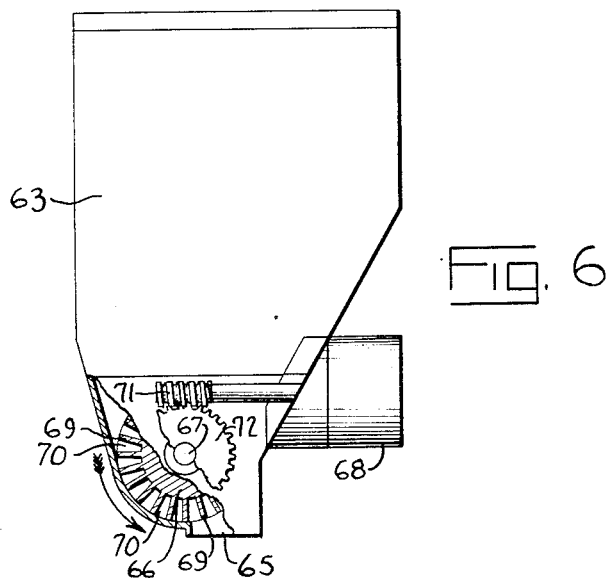
INVENTOR
RICHARD D. HOTVEDT
BY
G. H. Braddock
ATTORNEY March 13, 1951 R. D. HOTVEDT 2,544,836
COFFEE MAKING APPARATUS
Filed May 19, 1947 5 Sheets-Sheet 4
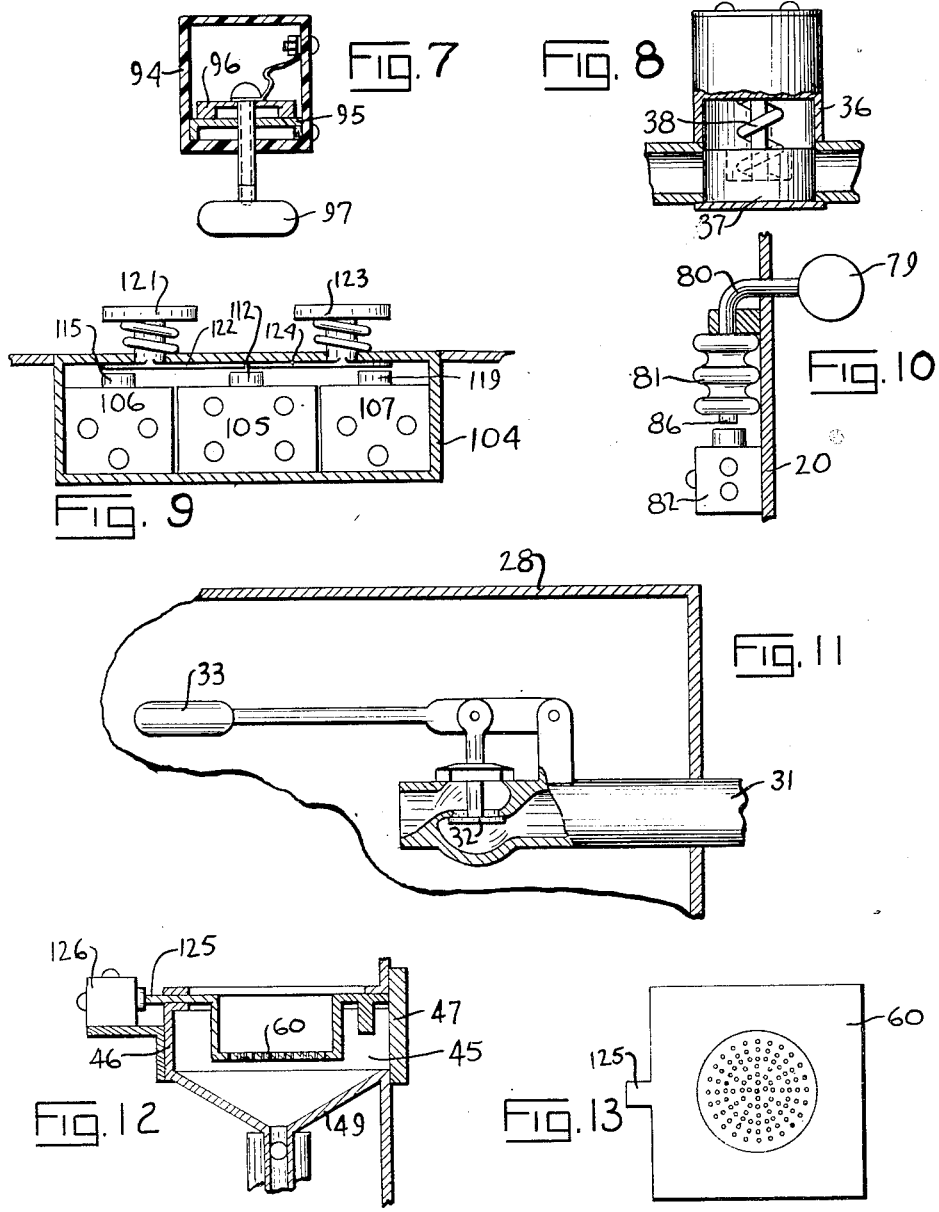
INVENTOR
RICHARD D. HOTVEDT
BY
G. H. Braddock
ATTORNEY March 13, 1951 R. D. HOTVEDT 2,544,836
COFFEE MAKING APPARATUS
Filed May 19, 1947 5 Sheets-Sheet 5
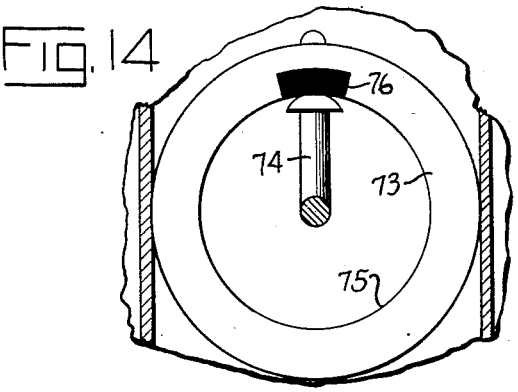
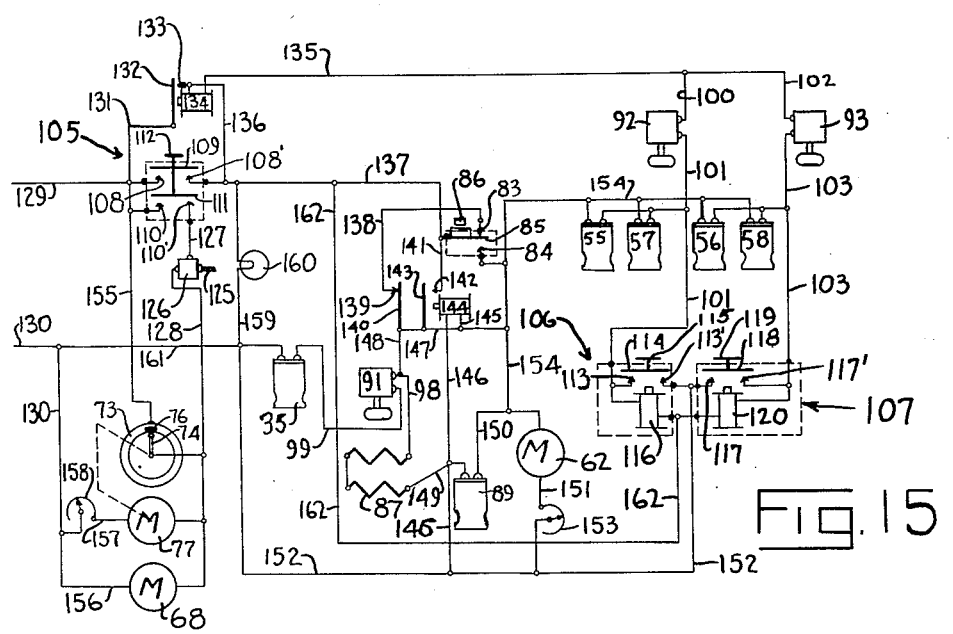
INVENTOR
RICHARD D. HOTVEDT
BY
G. H. Braddock
ATTORNEY Patented Mar. 13, 1951

2,544,836

UNITED STATES PATENT OFFICE 2,544,836

COFFEE-MAKING APPARATUS

Richard D. Hotvedt, Minneapolis, Minn.

Application May 19, 1947, Serial No. 748,889

13 Claims. (Cl. 99—282)

This invention has relation to an apparatus adapted to be put to use to brew coffee.

An object of the invention is to provide a coffee making apparatus which will be of novel and improved construction.

A further object is to provide an apparatus for brewing coffee wherein will be incorporated desirable and improved features and characteristics of construction novel both as individual entities of the apparatus and in combination with each other.

And a further object is to provide an apparatus for making coffee which will be of construction and adapted to function in the manner as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification,

Fig. 3 is a horizontal sectional view, taken substantially on line 3—3 in Fig. 2;

Fig. 4 is a vertical sectional view, taken substantially on line 4—4 in Fig. 2;

Fig. 5 is a horizontal sectional view, partially broken away, taken substantially on line 5—5 in Fig. 2;

Fig. 6 is an enlarged elevational view, partially in section and partially broken away, of a hopper and dumping mechanism for coffee of the apparatus;

Fig. 7 is a sectional view detailing a type of float switch several of which are included as parts of the apparatus;

Fig. 8 is a view, partially in elevation, partially in section and partially broken away, detailing a type of solenoid operated valve several of which are included as parts of the apparatus;

Fig. 9 is a sectional view, taken substantially on line 9—9 in Fig. 1, detailing a main and a pair of selective switches of the apparatus;

Fig. 10 is a sectional view, taken substantially on line 10—10 in Fig. 3, detailing a thermostatically operated switch of said apparatus;

Fig. 11 is a sectional view, taken substantially on line 11—11 in Fig. 3, detailing a float controlled valve of the apparatus;

Fig. 12 is a sectional view, taken substantially on line 12—12 in Fig. 5, detailing a removable strainer of said apparatus and parts with which said strainer is associated;

Fig. 13 is a plan view of the strainer as it would appear when removed from the apparatus;

Fig. 14 is a sectional view, taken substantially on line 14—14 in Fig. 4, detailing a timing mechanism of said apparatus; and Fig. 15 is a schematic view of a wiring system for the apparatus.

Figure 1:
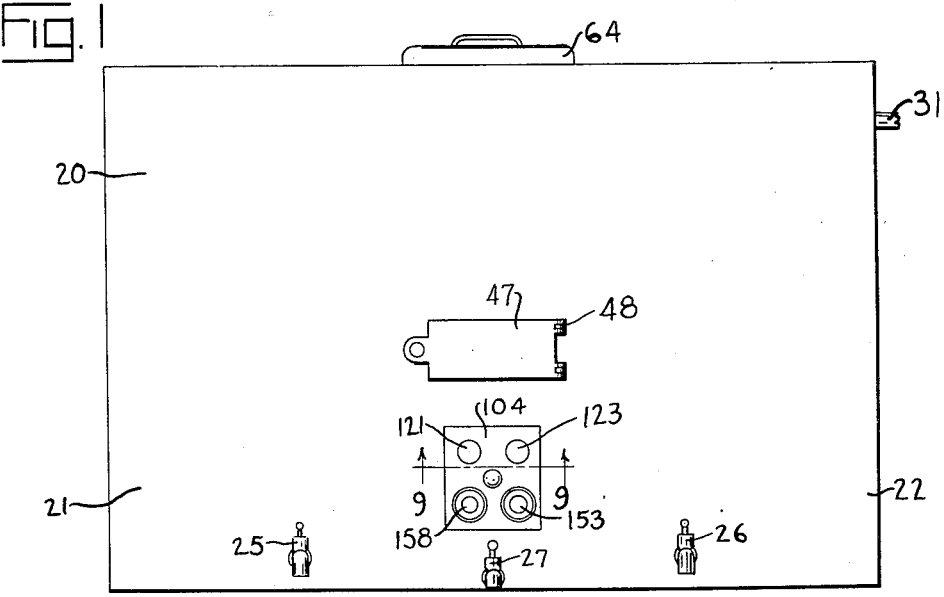
Fig. 1 is a front elevational view of a coffee making machine incorporating the features and characteristics of the invention.
Figure 2:
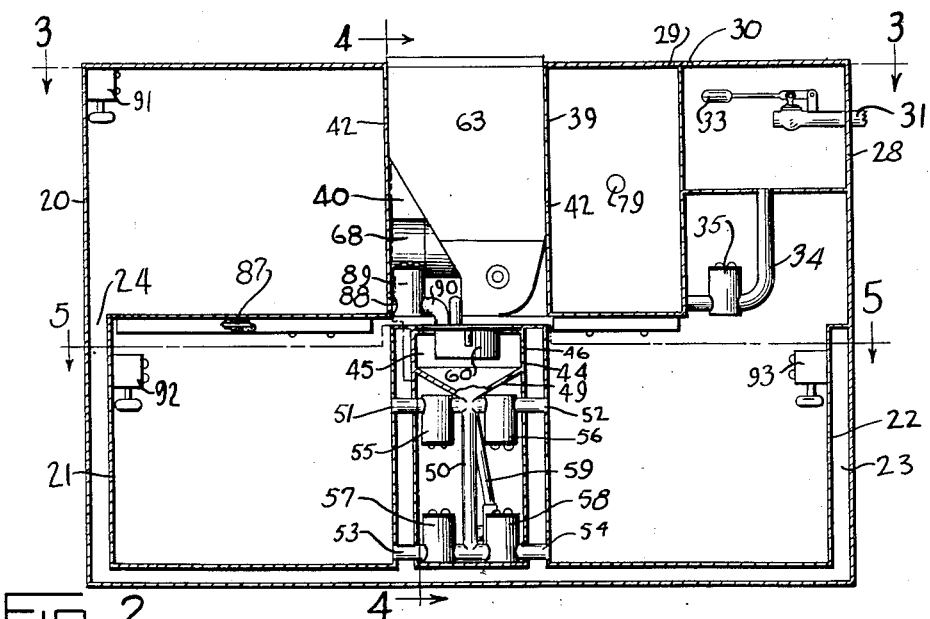
Fig. 2 is a vertical sectional view, taken substantially on line 2—2 in Fig. 4.

With respect to the drawings and the numerals of reference thereon, the coffee making apparatus includes a main or first tank 20, and auxiliary, or second and third, tanks, denoted 21 and 22, respectively. The main or first tank 20 is constituted as a water receiving upper vessel of the apparatus, and the auxiliary, or second and third, tanks 21 and 22 are constituted as water receiving lower vessels of said apparatus.

A water jacket in surrounding relation to said auxiliary, or second and third, tanks 21 and 22 is denoted 23, and said main or first tank 20 is open to said water jacket at 24. The auxiliary, or second and third, tanks 21 and 22 are in spaced apart relation in a single horizontal plane and directly below and in adjacent relation to the main or first tank 20 in the disclosure as made. The auxiliary, or second and third, tanks 21 and 22 are open at their upper portions and are otherwise closed. Manually actuable faucets for controlling outlets from lower portions of the tanks 21 and 22 are indicated 25 and 26, respectively, and a manually actuable faucet for controlling an outlet from the water jacket 23 is represented 27.

The tanks 20, 21 and 22 and the water jacket 23 are constituted as a unitary structure, and said unitary structure additionally includes a pressure reducing, or fourth, tank 28 which is as shown at a side of and in proximate relation to the upper portion of the tank 20, above the tank 22. The main or first and the pressure reducing or fourth tanks 20 and 28 are constituted as closed vessels. An outlet for air from an upper portion of said main or first tank 20 is designated 29, and an outlet for air from an upper portion of said pressure reducing or fourth tank 28 is represented 30.

An inlet pipe connection 31 is adapted to lead from a source (not shown) of water supply under pressure into the pressure reducing or fourth tank 28 by way of a float controlled valve 32 within said pressure reducing or fourth tank. A float 33 for said valve 32 is situated in an upper portion of the interior of the pressure reducing or fourth tank 28, and the construction and arrangement are such that said float will cause the valve 32 to be in closed condition, as in said Fig. 11, when the level of water in said pressure reducing or fourth tank has reached a predetermined level and will otherwise cause said valve 32 to be in open condition. Normally, there will be water in the pressure reducing or fourth tank 28 up to the level permitted by the float 33.

A pipe connection 34 leads from the lower wall of the pressure reducing or fourth tank 28 into the interior of the lower portion of the main or first tank 20, and a solenoid operated valve 35 along the length of said pipe connection 34 is for controlling passage of water from said pressure reducing or fourth tank into said main or first tank.

The coffee making apparatus includes several solenoid operated valves of the same type as the solenoid operated valve 35, and in Fig. 8 of the drawings one of these solenoid operated valves is disclosed in detail. A solenoid casing 36 houses a valve plug 37 adapted to be held in the closed condition of a passageway, as in said Fig. 8, by a coil spring 38 when the solenoid is deenergized and to be held in the open condition of said passageway against the action of said coil spring when said solenoid is energized.

The main or first tank 20 is bounded at its forward side by a vertical, rectilinear structure 39 which projects into and extends upwardly across the whole of the depth of said main or first tank, and said vertical, rectilinear structure 39 provides a rectilinear space 40 for receiving a hopper and dumping mechanism for coffee. More explicity, the vertical, rectilinear structure 39 is constituted as a rear wall 41, parallel with the forward wall of the main or first tank 20, spaced apart end walls 42, 42 parallel with each other and perpendicular to the rear wall 41, and a front wall 43 between the forward edges of the side walls 42, 42 and continuous with said forward wall of said main or first tank 20. The rear and side walls 41, 42, 42 effectually separate the rectilinear space 40 and the interior of the main or first tank 20 from each other, and the front wall 43 is at the sides of the side walls 42, 42 opposite said interior of said main or first tank. The lower portion of the vertical, rectilinear structure 39 is open.

The auxiliary, or second and third, tanks 21 and 22 support, in any suitable and convenient manner, a frame 44 which is situated between said tanks 21 and 22 directly below the rectilinear space 40. An upper portion of the frame 44 is constructed to provide a brewing chamber 45 which is open at its upper portion and defined at its side and rear portions by a vertical wall 46, at its front portion by the front wall 43 and an openable door 47 pivotally supported, as at 48, upon said front wall 43, and at its lower portion by a downwardly diverging wall 49. The construction and arrangement will be such that the door 47 when closed will be in water-tight relation to said front wall 43. A pipe connection leading vertically downwardly from the bottom of the downwardly diverging wall 49 is indicated 50, pipe connections leading horizontally from an upper portion of the pipe connection 50 to upper portions of the tanks 21 and 22 are denoted 51 and 52, respectively, and pipe connections leading from the lower end of said pipe connection 50 to lower portions of said tanks 21 and 22 are designated 53 and 54, respectively. Solenoid operated valves in each of the pipe connections 51, 52, 53 and 54, equivalent to the solenoid operated valve 35, are represented 55, 56, 57 and 58, respectively.

A pipe connection 59 leads from the lower end of the vertical pipe connection 50 to an upper portion of the brewing chamber 45 and opens to said brewing chamber at a location above a strainer 60 in the upper portion of the brewing chamber, and a pump 61 in the pipe connection 59 is adapted to be driven by an electric motor 62.

The hopper and dumping mechanism for coffee which the rectilinear space 40, provided by the vertical, rectilinear structure 39, is adapted to receive is clearly disclosed in Figs. 2, 3, 4 and 6 of the drawings. As there shown, a hopper for receiving granulated coffee beans is designated 63, and a removable cover for said hopper, shown in Fig. 1, is indicated 64. The hopper 63 includes an open lower end or outlet 65 situated directly above the strainer 60, and said hopper is supported within the vertical, rectilinear structure 39 in any suitable and convenient manner. The lower end portion of the hopper, adjacent the outlet 65, houses a dumping mechanism including a wheel 66 fixedly supported on a horizontal shaft 67 rotatably mounted in the hopper and adapted to be rotated by an electric motor 68. The periphery of the wheel 66 includes equally spaced, radially extending members 69 providing separate compartments 70 for granulated coffee beans. Said wheel 66 is adapted to be driven by the electric motor 68, in the direction of the arrow in Fig. 6, through the instrumentality of a worm 71 fixed on the shaft of said electric motor which meshes with a worm wheel 72 fixed on the horizontal shaft 67. The construction and arrangement will be such that when the wheel 66 is stationary, passage of granulated coffee beans from the upper portion of the hopper 63 to the hopper outlet 65 will be precluded and that when said wheel is rotated, measured quantities of granulated coffee beans will be fed to said outlet 65 and permitted to fall by gravity into the strainer 60.

A lower portion of a side wall 42 of the vertical, rectilinear structure 39 includes a port 88 which opens to a solenoid operated valve 89, equivalent to the solenoid operated valve 35, and a pipe connection 90 from said solenoid operated valve 89 opens to the brewing chamber 45 at a location above the strainer 60.

A timing mechanism of the apparatus is clearly disclosed in Figs. 4, 5 and 14. As there shown, 73 represents a contact ring insulatively, stationarily supported on the water jacket 23 at location between the tanks 21 and 22 and at the rear of the brewing chamber 45. A conducting rod 74 is adapted to be rotated while engaged with an internal cylindrical conducting surface 75 of said contact ring 73, and said internal cylindrical conducting surface 75 includes an insulating portion 76. Rotation of said conducting rod 74 is adapted to be accomplished by an electric motor 77, suitably and conveniently supported on the water jacket 23, through the instrumentality of reducing mechanism housed in a gear box 78 insulatively supported upon said water jacket.

A thermostatically operated switch of the apparatus is clearly disclosed in Figs. 2, 3, 4 and 10. A bulb 79 situated within the main or first tank 20, at about the midheight of said main or first tank, is integral with an L-shape tube 80 which passes outwardly of and is supported in an opening through said main or first tank, and said L-shape tube 80 integrally supports a bellows 81. Said bulb 79, L-shape tube 80 and bellows 81 constitute an entity containing expansible and contractible fluid. A switch 82, suitably and conveniently supported on the tank 20, includes spaced apart, fixed contact elements 83 and 84 and a movable contact element 85 between said fixed contact elements 83 and 84. The bellows 81 is adapted to be in a contracted condition to situate an actuator 86 on said bellows to permit the movable contact element 85 to be engaged with the fixed contact element 83 and separated from the fixed contact element 84 when the temperature of water in the tank 20 is relatively low and to be in an expanded condition to situate said actuator to cause said movable contact element 85 to be engaged with said fixed contact element 84 and separated from said fixed contact element 83 when the temperature of water in said tank 20 is comparatively higher. The construction and arrangement are such that the elements 83, 85 will be engaged and the elements 84, 85 will be disengaged when the temperature of water in the tank 20 is relatively low and an electric heater 87 of the apparatus is to be energized and that the elements 84, 85 will be engaged and said elements 83, 85 will be disengaged when the temperature of water in said tank 20 has reached a predetermined high temperature at which said electric heater 87 is to be deenergized. The electric heater 87 is, in the disclosure as made, suitably and conveniently supported beneath the tank 20.

A float switch 91 is suitably and conveniently supported in an upper portion of the main or first tank 20, and float switches, denoted 92 and 93, respectively, are suitably and conveniently supported in upper portions of the auxiliary, or second and third, tanks 21 and 22.

The float switches 91, 92 and 93 can be of duplicate construction. Fig. 7 discloses a type of float switch suitable for use in the apparatus and equivalent to any of the float switches 91, 92 and 93. A Bakelite casing 94 fixedly supports a contact element 95 and movably supports a contact element 96. A float 97, rigid with said movable contact element 96, is adapted to be situated at a lower elevation, as in said Fig. 7, to cause the fixed and movable contact elements 95 and 96 to be engaged when water in the tank having the float switch is below a predetermined level and to be situated at a higher elevation to cause said fixed and movable contact elements 95 and 96 to become disengaged when the water has reached a predetermined high level.

Lead wires to and from the float switch 91 are denoted 98 and 99, lead wires to and from the float switch 92 are represented 100 and 101, and lead wires to and from the float switch 93 are indicated 102 and 103.

A switch box 104, rigid with the forward wall of the apparatus, rigidly contains a main switch 105 and a pair of selective switches, designated 106 and 107, respectively.

The main switch 105 includes fixed contacts 108, 108' adapted to be bridged by a movable contact element 109, fixed contacts 110, 110' adapted to be bridged by a movable contact element 111, and a push button 112 for operating the movable contact elements 109 and 111 in unison. The construction and arrangement are such that the elements 108, 109, 108' and 110, 111 and 110' are normally in separated relation.

The selective switch 106 includes fixed contacts 113, 113' adapted to be bridged by a movable contact element 114, and a push button 115 for operating the movable contact element 114. The elements 113, 114, 113' are in separated relation when a contactor 116 is deenergized, and said contactor 116 is adapted when energized to retain the movable contact element 114 engaged with the fixed contact elements 113, 113'.

The selective switch 107 includes fixed contacts 117, 117' adapted to be bridged by a movable contact element 118, and a push button 119 for operating the movable contact element 118. The elements 117, 118, 117' are in separated relation when a contactor 120 is deenergized, and said contactor 120 is adapted when energized to retain the movable contact element 118 engaged with said fixed contact elements 117, 117'.

A push button 121 slidably mounted in the front wall of the switch box 104 rigidly supports a first actuator bar 122 adapted to be actuated to cause the main switch 105 and the selective switch 106 to be simultaneously moved to closed condition, and a push button 123 slidably mounted in said front wall of said switch box rigidly supports a second actuator bar 124 adapted to be actuated to cause said main switch 105 and the selective switch 107 to be simultaneously moved to closed condition.

The strainer 60 is removably supported in the upper portion of the brewing chamber 45 adjacent the opening covered by the door 47, and said strainer 60 includes an extension portion 125 adapted to retain a switch 126 in closed condition when the strainer is in its operative position. Lead wires to and from the switch 126 are denoted 127 and 128, and the construction and arrangement are such that said switch 126 is held in open condition when said strainer is removed from the apparatus.

Incoming lead wires 129 and 130 are from a suitable source (not shown) of electrical current.

The incoming lead wire 129 is connected to the fixed contacts 108 and 110, and a lead wire 131 extends from said incoming lead wire 129 to a movable contact element 132 for engagement with a fixed contact 133. A contactor 134 is adapted to retain the elements 132, 133 engaged when said contactor is energized, and said elements 132, 133 are adapted to be in separated relation when the contactor 134 is deenergized. A lead wire 135 extends from the contactor 134 to the lead wires 100 and 102, and a lead wire 136 extends from the fixed contact 133 and said contactor 134 to the fixed contact 108'.

A lead wire 137 extends from the lead wire 136 to the movable contact element 85, and a lead wire 138 extends from the fixed contact 83 to a fixed contact 139 normally engaged with a movable contact element 140. A lead wire 141 extends from the lead wire 137 to a fixed contact 142 normally separated from a movable contact element 143. The elements 139, 140 are adapted to be engaged and the elements 142, 143 are adapted to be disengaged when a contactor 144 is deenergized, and said elements 139, 140 are adapted to be disengaged and said elements 142, 143 are adapted to be engaged when said contactor 144 is energized. Lead wires to and from the contactor 144 are indicated 145 and 146, and a lead wire 147 connects the movable contact elements 140 and 143 to each other and to the lead wire 145. A lead wire 148 extends from the lead wire 147 to the lead wire 98, and said lead wire 98 is connected to the electric heater 87.

A lead wire 149 extends from said electric heater 87 to the solenoid of the valve 89, a lead wire 150 extends from said solenoid to the electric motor 62, a lead wire 151 extends from said electric motor 62 to a lead wire 152, a rheostat along the length of the lead wire 151 is denoted 153, and the lead wire 152 is connected to the incoming lead wire 130. The lead wire 146 is connected to the lead wires 149 and 152, and a lead wire 154 extends between the lead wires 147 and 150.

A lead wire 155 extends from the incoming lead wire 129 to the contact ring 73, the lead wire 127 is connected to the fixed contact 110', and the lead wire 128 is connected to the conducting rod 74 and the electric motors 68 and 77. Lead wires 156 and 157 from said electric motors are connected to the incoming lead wire 130, and the lead wire 157 includes a rheostat 158. A lead wire 159, including a pilot lamp 160, extends from the lead wire 137 to a lead wire 161 which connects the incoming lead wire 130 with the solenoid of the valve 35, and the lead wire 99 is connected to said solenoid.

The lead wire 154 connects the fixed contact 84 with the solenoid of each of the valves 55, 57, 56, 58, and the lead wires 101 and 103 are connected to the solenoids of the valves 55, 57 and 56, 58, respectively, as well as to the fixed contacts 113 and 117', respectively, and to the contactors 116 and 120, respectively. The lead wire 152 extends to the fixed contacts 113' and 117, and the contactors 116, 120 are interconnected by a lead wire 162 which extends from the lead wire 137.

The pressure reducing or fourth tank 28 of course will normally contain water up to the level permitted by the float controlled valve 32, and water will flow into the main or first tank 20 from said pressure reducing or fourth tank 28, by way of the pipe connection 34, whenever the solenoid operated valve 35 is in open condition.

In Fig. 15 of the drawings, the various elements of the electrical equipment of the apparatus are disclosed in the positions they assume when the apparatus is not in use.

When coffee is to be brewed in the auxiliary, second tank 21, the push button 121 will be actuated to cause the main switch 105 and the selective switch 106 to be closed, and when coffee is to be brewed in the auxiliary, third tank 22, the push button 123 will be actuated to cause said main switch 105 and the selective switch 107 to be closed.

A circuit for causing the elements 132, 133 to become engaged will be completed through the holding contactor 134 upon closing of the main switch 105 and the selective switch 106, said circuit being traced from the incoming lead wire 129 to said holding contactor 134 through 108, 109, 108' and 136, and thence through 135, 100, 92, 101, fixed contact 113, movable contact element 114, fixed contact 113' and lead wire 152 back to the incoming lead wire 130. Upon engagement of the elements 132, 133 and 113, 114, 113', a holding circuit for the contactors 134 and 116 will be established, said holding circuit being traced from the incoming lead wire 129 back to the incoming lead wire 130 through 131, 132, 133, 136, 137 and 162 to the contactor 116, and thence through 101, 113, 114, 113' and 152.

Engagement of the elements 132, 133 establishes a circuit including the float switch 91 and the solenoid of the valve 35, said circuit being traced from the incoming lead wire 129 through the lead wire 131 to said elements 132, 133, thence through the lead wires 136 and 137 to the movable contact element 85, thence through the fixed contact 83, the lead wire 138, the fixed contact 139, the movable contact element 140 and the lead wires 148 and 98 to said float switch 91, thence through the lead wire 99 to said solenoid of said valve 35, and thence through the lead wire 161 back to the incoming lead wire 130.

It will be evident that closing of the main switch 105 will cause the solenoid of the valve 35 to be energized and moved to open condition to permit flow of water from the pressure reducing or fourth tank 28 into the main or first tank 20, and that when water in said main or first tank reaches the level causing the float switch 91 to be moved to open condition, the energizing circuit through said solenoid of the valve 35 will be broken and this valve will close to shut off further flow of water into the main or first tank.

The coffee dumper is adapted to deliver a desired amount of granulated coffee beans to the strainer 60 during the interval the main or first tank 20 is becoming filled with water. Upon closing of the main switch 105, a circuit is completed through the electric motors 68 and 77, said circuit being traced from the incoming lead wire 129 through the lead wire 155, the fixed contact 110, the movable contact element 111, the fixed contact 110', the lead wire 127, the switch 126 and the lead wire 128 to said electric motors 68 and 77, and thence from these switches back to the incoming lead wire 130 through the lead wires 156 and 157. During the short interval the main switch 105 is closed, the motor 77 will operate to cause the conducting rod 74 to become removed from the insulating portion 76 and engage the conducting surface 75, and thus a circuit will be completed through the electric motors 68 and 77 from the incoming lead wire 129 through the lead wire 155, the contact ring 73, the conducting rod 74 and the lead wire 128 to said electric motors 68 and 77, and thence back to the incoming lead wire 130 through said lead wires 156 and 157. Evidently, this latter circuit will be broken when said conducting rod has completed a revolution back to its position of engagement with the insulating portion 76. The setting of the rheostat 158 will control the speed of the timer electric motor 77. The speed of the dumper electric motor 68 will be constant and independent of the speed of the timer electric motor. The obvious purpose of the rheostat 158 is to assist in controlling the strength of the brewed coffee.

The electric heater 87 is adapted to cause water in the main or first tank 20 to be heated in response to closing of the main switch 105. A holding circuit including the movable contact element 85 and the fixed contact 83 of the thermostatically operated switch 82 and also including the electric heater 87 will be established when the main switch 105 is closed, said circuit being traced from the incoming lead wire 129 back to the incoming lead wire 130 through 131, 132, 133, 136, 137, said movable contact element 85, said fixed contact 83, 138, 139, 140, 148, 98, said electric heater 87 and 149, 146 and 152. When the water in the main or first tank 20 becomes elevated to the desired temperature, the actuator 86 on the bellows 81 will cause the movable contact element 85 to become disengaged from the fixed contact 83 and engage the fixed contact 84. Upon disengagement of the elements 83, 85, the circuit for the electric heater 87 will become broken and said electric heater will be deenergized and cease functioning.

A circuit for the contactor 144 will be established upon engagement of the elements 84, 85, said circuit being traced from 129 back to 130 through 131, 132, 133, 136, 137, movable contact element 85, fixed contact 84, 154, 147, 145, said contactor 144, 146 and 152, and this last mentioned contactor upon being energized will cause the elements 139, 140 to be disengaged and the elements 142, 143 to be engaged. Disengagement of the elements 139, 140 will preclude possibility of energization of the solenoid of the valve 35 in response to falling of the water level in the main or first tank 20, and also will preclude the possibility of energization of the electric heater 87 in response to falling of the temperature of the water in said main or first tank. Engagement of the elements 142, 143 establishes a holding circuit for the contactor 144, said circuit being traced from 129 back to 130 through 131, 132, 136, 137, 141, 142, 143, 147, 145, said contactor 144, 146 and 152.

A circuit for the solenoid of the valve 89 from the incoming lead wire 129 back to the incoming lead wire 130 includes 131, the elements 132, 133 when engaged, 136, 137, 141, fixed contact 142 and movable contact element 143 when engaged, 147, 154, 150, said solenoid of said valve 89, 149, 146 and 152.

A circuit for the solenoids of the valves 55 and 57 from said incoming lead wire 129 back to said incoming lead wire 130 includes 131, 132 and 133 when engaged, 136, 137, 141, 142 and 143 when engaged, 147, 154, said solenoids of said valves 55 and 57, 101, 113, 114, 113' and 152.

A circuit for the electric motor 62 from the incoming lead wire 129 back to the incoming lead wire 130 includes 131, 132 and 133 when engaged, 136, 137, 141, 142 and 143 when engaged, 147, 154, 150, said electric motor 62, 151 and 152.

Immediately when the elements 142, 143 become engaged, the circuits as described including the solenoid of the valve 89, the solenoids of the valves 55, 57 and the electric motor 62 will become energized. Energization of the solenoids of the valves 89, 55 and 57 will cause these valves to be moved to open condition to permit water to be fed from the main or first tank 20 by way of the pipe connection 90 and permitted to flow to and through the strainer 60 and the granulated coffee beans which said strainer contains, as well as through the vertical pipe connection 50 and the pipe connection 51 into the auxiliary, second tank 21. Energization of the electric motor 62 will cause the pump 61 in the pipe connection 59 to be operative to recirculate the coffee brew or water, from the auxiliary, second tank 21 by way of the pipe connection 53 through said pipe connection 59 back to the strainer 60 and its contained granulated coffee beans. The construction and arrangement will be such that the pump 61 will cause the coffee brew or water to be pumped back to the brewing chamber 45 at a slower rate than that at which water enters said brewing chamber from the main or first tank 20. Thus, the auxiliary, second tank 21 will become filled during the interval recirculation is occurring, and when the level of the coffee brew in said auxiliary, second tank 21 is at elevation to cause the float switch 92 to be in open condition, the holding circuit for the contactor 134 will become broken and all of the elements of the electrical equipment of the apparatus will be in or moved to their out of use positions as in Fig. 15. The solenoid operated valves 89, 55 and 57 will be moved to closed condition and the electric motor 62 will become deenergized immediately when the elements 132, 133 become disengaged to cause the circuits including said solenoid operated valves 89, 55 and 57 and said electric motor 62 to become broken. The obvious purpose of the rheostat 153 in the circuit of the electric motor 62 is to assist in controlling the strength of the brewed coffee.

A circuit for causing the elements 132, 133 to become engaged also will be completed through the holding contactor 134 upon closing of the main switch 105 and the selective switch 107, said circuit being traced from 129 back to 130 through 108, 109, 108', 136, 134, 135, 102, 93, 103, 117', 118, 117 and 152. Upon engagement of the elements 132, 133 and 117, 118, 117', a holding circuit for the contactors 134 and 120 will be established, said holding circuit being from 129 back to 130 through 131, 132, 133, 136, 137, 162, 120, 103, 117', 118, 117 and 152.

Engagement of the elements 132, 133 establishes the circuit as before described including the float switch 91 and the solenoid of the valve 35, so that closing of the main switch 105 will cause the solenoid of the valve 35 to be energized with the same results as before set forth. Also, closing of said main switch 105 will complete the circuit as hereinbefore traced through the electric motors 68 and 77, so that said electric motors 68 and 77 will function in the manner as aforesaid. The electric heater 87 likewise will be made operative and then inoperative and the elements 83, 85 will become separated and the elements 84, 85 will become engaged in the manner and with the results as already set forth in response to closing of the main switch 105 and the selective switch 107, except that the solenoids of the valves 56 and 58, instead of the solenoids of the valves 55 and 57, will be connected in a circuit from 129 back to 130 through 131, 132, 133, 136, 137, 141, 142, 143, 147, 154, said solenoids of said valves 56 and 58, 103, 117', 118, 117 and 152.

Energization of the solenoids of the valves 89, 56 and 58 will cause said valves to be moved to open condition so that water will flow from the main or first tank 20 to the strainer 60 and the granulated coffee beans contained by said strainer, and also through the vertical pipe connection 50 and the pipe connection 52 into the auxiliary, third tank 22. And energization of the electric motor 62 will cause the pump 61 to be operative to accomplish recirculation, from said auxiliary, third tank 22 by way of the pipe connection 54 through the pipe connection 59 back to the strainer 60 and granulated coffee beans. When the level of the coffee brew in the auxiliary, third tank 22 is at elevation to cause the float switch 93 to be in open condition, the holding circuit for the contactor 134 will become broken with the same results as hereinbefore made plain.

The switch 126 is in the circuit required to be closed to cause the electric motor 68 to become energized, and inasmuch as this switch is retained in open condition at all times other than when the strainer 60 is at its proper set position, said electric motor 68 is capable of operation to deposit granulated coffee beans into the brewing chamber only when said strainer is properly situated.

Flushing operations can be accomplished while the strainer 60 is removed from the apparatus and the electric motor 68 is incapable of operation. Both the second and third tanks 21 and 22 can be flushed simultaneously, or these tanks can be flushed separately, one being flushed while the other contains brewed coffee. When both of the tanks 21 and 22 are to be flushed simultaneously, both push buttons 121 and 123 will be depressed. Obviously, the water in the main or first tank 20 will become heated in the manner as already described. Upon becoming heated, the water will travel from said main or first tank 20 into the chamber 45, the pipe connections for coffee brew and said second and third tanks 21 and 22 and be recirculated in the manner as aforesaid to cause all of the passages for coffee and said tanks 21 and 22 to be flushed. After flushing, the second and third tanks 21 and 22 can be emptied of water.

Hot water will be available at the faucet 27 from the water jacket 23, and heater elements (not shown) can be provided for maintaining the water in said water jacket at any temperature which may be preferred.

The various elements of the apparatus can be composed of any material suitable to their purposes. Desirably, all of the valves, floats, fittings, pipe connections, etc., can be of glass. And, too, all of the tanks of said apparatus can be lined with glass.

What is claimed is:

1. An apparatus for making a beverage consisting of liquid and solid substances, comprising a main vessel in which the temperature of the liquid substance is to be elevated, a resistance element for causing said main vessel to be heated, a normally closed first float controlled switch in the main vessel adapted to be opened in response to raising of the level of the liquid in said main vessel, a first connection for liquid from a source of supply to said main vessel, a normally closed first electrically operated valve for precluding passage of the liquid by way of said first connection to said main vessel, a vessel for receiving said beverage, a normally closed second float controlled switch in the receiving vessel adapted to be opened in response to raising of the level of the beverage in said receiving vessel, a brewing chamber, electrically operated means for delivering a measured amount of a solid substance to said brewing chamber, a second connection from the main vessel to the brewing chamber, a normally closed second electrically operated valve for controlling passage of the liquid by way of said second connection from said main vessel to said brewing chamber, a third connection between the brewing chamber and said receiving vessel, first contact elements adapted to be engaged when the temperature of the liquid in the main tank is relatively low, thermostatically operated means for causing said first contact elements to become disengaged in response to elevation of the temperature of the liquid in said main vessel, normally disengaged second contact elements adapted to be engaged in response to manual operation of a switch, a contactor for retaining said second contact elements in engaged relation, a holding circuit for said contactor controlled by said second float controlled switch and including the second contact elements, a circuit for the first electrically operated valve controlled by said first float controlled switch adapted to be made in response to engagement of said second contact elements to cause said first electrically operated valve to be moved to open condition and to be broken in response to opening of the first float controlled switch to permit the first electrically operated valve to be moved to closed condition, a circuit for energizing said electrically operated means adapted to be established in response to manual operation of said switch, means for causing said last mentioned circuit to be broken when said measured amount of said solid substance has been delivered to said brewing chamber, a circuit for said resistance element adapted to be established through said first contact elements and to be broken when the first contact elements become disengaged, and a circuit for the second electrically operated valve including said second contact elements.

2. An apparatus for making a beverage consisting of liquid and solid substances, comprising a main vessel in which the temperature of a liquid substance is to be elevated, a resistance element for causing said main vessel to be heated, a normally closed first float controlled switch in the main vessel adapted to be opened in response to raising of the level of the liquid in said main vessel, a first connection for delivering liquid substance to said main vessel from a source of supply, a normally closed first electrically operated valve for precluding passage of the liquid substance by way of said first connection to said main vessel, a vessel for receiving said beverage, a normally closed second float controlled switch in the receiving vessel adapted to be opened in response to raising of the level of the beverage in said receiving vessel, a brewing chamber, electrically operated means for delivering a measured amount of a solid substance to said brewing chamber, a second connection from the main vessel to the brewing chamber, a normally closed second electrically operated valve for controlling passage of the liquid substance by way of said second connection from said main vessel to said brewing chamber, a third connection between the brewing chamber and said receiving vessel, first contact elements adapted to be engaged and second contact elements adapted to be disengaged when the temperature of the liquid substance in the main vessel is relatively low, thermostatically operated means for causing said first contact elements to become disengaged and said second contact elements to become engaged in response to elevation of the temperature of the liquid substance in said main vessel, normally disengaged third contact elements adapted to be engaged in response to manual operation of a switch, a contactor for retaining said third contact elements in engaged relation, a holding circuit for said contactor controlled by said second float controlled switch including the third contact elements, a circuit for said first electrically operated valve controlled by said first float controlled switch adapted to be made in response to engagement of said third contact elements to cause said first electrically operated valve to be moved to open condition and to be broken in response to opening of the first float controlled switch to permit the first electrically operated valve to be moved to closed condition, a circuit for energizing said electrically operated means adapted to be established in response to manual operation of said switch, means for causing said last mentioned circuit to be broken when said measured amount of said solid substance has been delivered to said brewing chamber, a circuit for said resistance element adapted to be established through said first contact elements upon engagement of said third contact elements and to be broken when the first contact elements become disengaged, and a circuit for the second electrically operated valve adapted to be established through said third contact elements upon engagement of said second contact elements and to be broken when the third contact elements become disengaged.

3. The combination as specified in claim 2, a second contactor for retaining said first contact elements in disengaged relation and said second contact elements in engaged relation, and a holding circuit for said second contactor including said third contact elements.

4. The combination as specified in claim 1, said circuit for said electrically operated valve including said first contact elements, a second contactor for retaining the first contact elements in disengaged relation, and a holding circuit for said second contactor controlled by said second contact elements.

5. The combination as specified in claim 1, an electric motor for causing the beverage to be pumped from said receiving vessel to said brewing chamber in contacting relation with said solid substance, and a circuit for said electric motor controlled by said second contact elements.

6. The combination as specified in claim 2, a fourth connection between said receiving chamber and said brewing chamber, an electric motor for causing the beverage to be pumped through said fourth connection from said receiving vessel to the brewing chamber in contacting relation with said solid substance, and a circuit for said electric motor adapted to be established through said third contact elements upon engagement of said second contact elements and to be broken when the third contact elements become disengaged.

7. The combination as specified in claim 2, a second contactor for retaining said first contact elements in disengaged relation and said second contact elements in engaged relation, a holding circuit for said second contactor including said third contact elements, a fourth connection between said receiving chamber and said brewing chamber, an electric motor for causing the beverage to be pumped through said fourth connection from said receiving vessel to the brewing chamber in contacting relation with said solid substance, and a circuit for said electric motor adapted to be established through said third contact elements upon engagement of said second contact elements and to be broken when the third contact elements become disengaged.

8. An apparatus for making a beverage consisting of liquid and solid substances, comprising a main vessel in which the temperature of a liquid substance is to be elevated, a resistance element for causing said main vessel to be heated, a normally closed first float controlled switch in the main vessel adapted to be opened in response to raising of the level of the liquid in said main vessel, a first connection for delivering the liquid substance to said main vessel from a source of supply, a normally closed electrically operated valve for precluding passage of the liquid substance by way of said first connection to said main vessel, first and second vessels adapted selectively to receive said beverage, normally closed second and third float controlled switches in the first and second receiving vessels, respectively, adapted to be opened in response to raising of the level of the beverage in said first and second vessels, a brewing chamber, electrically operated means for delivering a measured amount of a solid substance to said brewing chamber, a second connection from the main vessel to the brewing chamber, a normally closed second electrically operated valve for controlling passage of the liquid substance by way of said second connection from said main vessel to said brewing chamber, third and fourth connections between the brewing chamber and said first and second receiving vessels, respectively, normally closed third and fourth electrically operated valves for controlling passage of the liquid and solid substances by way of said third and fourth connections from said brewing chamber to said first and second receiving vessels, respectively, first contact elements adapted to be engaged and second contact elements adapted to be disengaged when the temperature of the liquid substance in the main vessel is relatively low, thermostatically operated means for causing said first contact elements to become disengaged and said second contact elements to become engaged in response to elevation of the temperature of the liquid substance in said main vessel, a first contactor for retaining said first contact elements in disengaged relation and said second contact elements in engaged relation, a main switch, first and second selective switches, normally disengaged third contact elements adapted to be engaged in response to simultaneous closing of said main switch and either said first or second selective switch, a second contactor for retaining said third contact elements in engaged relation, third and fourth contactors for retaining said first and second selective switches, respectively, in engaged relation, a holding circuit for said first contactor including said second and third contact elements, a holding circuit for said second and third contactors controlled by said second float controlled switch including the third contact elements and the first selective switch, a holding circuit for said second and fourth contactors controlled by said third float controlled switch including said third contact elements and the second selective switch, a circuit for said first electrically operated valve controlled by said first float controlled switch adapted to be made in response to engagement of said third contact elements to cause said first electrically operated valve to be moved to open condition and to be broken in response to opening of the first float controlled switch to permit the first electrically operated valve to be moved to closed condition, a circuit for energizing said electrically operated means adapted to be established in response to closing of said main switch, means for causing said last mentioned circuit to be broken when said measured amount of said solid substance has been delivered to said brewing chamber, a circuit for said resistance element adapted to be established through said first contact elements upon engagement of said third contact elements and to be broken when the first contact elements become disengaged, a circuit for said second electrically operated valve adapted to be established through said third contact elements upon engagement of said second contact elements while either said first selective switch or said second selective switch is closed and to become broken when the third contact elements become disengaged, a circuit for said third electrically operated valve adapted to be established through the third contact elements upon engagement of said second contact elements while said first selective switch is closed and to become broken when said third contact elements become disengaged, and a circuit for said fourth electrically operated valve adapted to be established through said third contact elements upon engagement of the second contact elements while said second selective switch is closed and to become broken when the third contact elements become disengaged.

9. The combination as specified in claim 8, fifth and sixth connections between said first and second receiving vessels, respectively, and said brewing chamber, normally closed fifth and sixth electrically operated valves for controlling passage of the beverage by way of said fifth and sixth connections from said first and second receiving vessels, respectively, to said brewing chamber, said fifth and sixth electrically operated valves, respectively, being adapted to be included in circuits controlling said third and fourth electrically operated valves, respectively, an electric motor for causing the beverage to be pumped through said fifth connection when the third and fifth electrically operated valves are open and through said sixth connection when the fourth and sixth electrically operated valves are open from said first and second receiving vessels, respectively, to the brewing chamber in contacting relation with said solid substance, and a circuit for said electric motor adapted to be established through said third contact elements upon engagement of said second contact elements while either said first selective switch or said second selective switch is closed and to become broken when the third contact elements become disengaged.

10. In an apparatus of the character described, a main vessel in which the temperature of a liquid substance is to be elevated, a resistance element for causing said main vessel to be heated, a normally closed first float controlled switch in the main vessel adapted to be opened in response to raising of the level of the liquid substance in said main vessel, a first connection for liquid substance from a source of supply to said main vessel, a normally closed first electrically operated valve for precluding passage of the liquid substance by way of said first connection to said main vessel, a vessel for receiving said liquid, a normally closed second float controlled switch in the receiving vessel adapted to be opened in response to raising of the level of the liquid in said receiving vessel, a chamber, a second connection from the main vessel to said chamber, a normally closed second electrically operated valve for controlling passage of the liquid substance by way of said second connection from said main vessel to said chamber, a third connection between the chamber and said receiving vessel, first contact elements adapted to be engaged when the temperature of the liquid in the main tank is relatively low, thermostatically operated means for causing said first contact elements to become disengaged in response to elevation of the temperature of the liquid substance in said main vessel, normally disengaged second contact elements adapted to be engaged in response to manual operation of a switch, a contactor for retaining said second contact elements in engaged relation, a holding circuit for said contactor controlled by said second float controlled switch and including the second contact elements, a circuit for the first electrically operated valve controlled by said first float controlled switch adapted to be made in response to engagement of said second contact elements to cause said first electrically operated valve to be moved to open condition and to be broken in response to opening of the first float controlled switch to permit the first electrically operated valve to be moved to closed condition, a circuit for said resistance element adapted to be established through said first contact elements and to be broken when the first contact elements become disengaged, and a circuit for the second electrically operated valve including said second contact elements.

11. In an apparatus of the character described, a main vessel in which the temperature of a liquid substance is to be elevated, a resistance element for causing said main vessel to be heated, a normally closed first float controlled switch in the main vessel adapted to be opened in response to raising of the level of the liquid in said main vessel, a first connection for delivering liquid substance to said main vessel from a source of supply, a normally closed electrically operated valve for precluding passage of the liquid substance by way of said first connection to said main vessel, a vessel for receiving said liquid substance, a normally closed second float controlled switch in the receiving vessel adapted to be opened in response to raising of the level of the liquid in said receiving vessel, a chamber, a second connection from the main vessel to said chamber, a normally closed second electrically operated valve for controlling passage of the liquid substance by way of said second connection from said main vessel to said chamber, a third connection between the chamber and said receiving vessel, first contact elements adapted to be engaged and second contact elements adapted to be disengaged when the temperature of the liquid substance in the main vessel is relatively low, thermostatically operated means for causing said first contact elements to become disengaged and said second contact elements to become engaged in response to elevation of the temperature of the liquid substance in said main vessel, normally disengaged third contact elements adapted to be engaged in response to manual operation of a switch, a contactor for retaining said third contact elements in engaged relation, a holding circuit for said contactor controlled by said second float controlled switch including the third contact elements, a circuit for said first electrically operated valve controlled by said first float controlled switch adapted to be made in response to engagement of said third contact elements to cause said first electrically operated valve to be moved to open condition and to be broken in response to opening of the first float controlled switch to permit the first electrically operated valve to be moved to closed condition, a circuit for said resistance element adapted to be established through said first contact elements upon engagement of said third contact elements and to be broken when the first contact elements become disengaged, and a circuit for the second electrically operated valve adapted to be established through said third contact elements upon engagement of said second contact elements and to be broken when the third contact elements become disengaged.

12. In an apparatus of the character described, a main vessel in which the temperature of a liquid substance is to be elevated, a resistance element for causing said main vessel to be heated, a normally closed first float controlled switch in the main vessel adapted to be opened in response to raising of the level of the liquid substance in said main vessel, a first connection for delivering the liquid substance to said main vessel from a source of supply, a normally closed first electrically operated valve for precluding passage of the liquid substance by way of said first connection to said main vessel, first and second vessels adapted selectively to receive said liquid substance, normally closed second and third float controlled switches in the first and second receiving vessels, respectively, adapted to be opened in response to raising of the level of the liquid substance in said first and second receiving vessels, a chamber, a second connection from the main vessel to said chamber, a normally closed second electrically operated valve for controlling passage of the liquid substance by way of said second connection from said main vessel to said chamber, third and fourth connections between the chamber and said first and second receiving vessels, respectively, normally closed third and fourth electrically operated valves for controlling passage of the liquid substance by way of said third and fourth connections from said chamber to said first and second receiving vessels, respectively, first contact elements adapted to be engaged and second contact elements adapted to be disengaged when the temperature of the liquid substance in the main vessel is relatively low, thermostatically operated means for causing said first contact elements to become disengaged and said second contact elements to become engaged in response to elevation of the temperature of the liquid substance in said main vessel, a first contactor for retaining said first contact elements in disengaged relation and said second contact elements in engaged relation, a main switch, first and second selective switches, normally disengaged third contact elements adapted to be engaged in response to simultaneous closing of said main switch and either said first or second selective switch, a second contactor for retaining said third contact elements in engaged relation, third and fourth contactors for retaining said first and second selective switches, respectively, in engaged relation, a holding circuit for said first contactor including said second and third contact elements, a holding circuit for said second and third contactors controlled by said second float controlled switch including the third contact elements and the first selective switch, a holding circuit for said second and fourth contactors controlled by said third float controlled switch including said third contact elements and the second selective switch, a circuit for said first electrically operated valve controlled by said first float controlled switch adapted to be made in response to engagement of said third contact elements to cause said first electrically operated valve to be moved to open condition and to be broken in response to opening of the first float controlled switch to permit the first electrically operated valve to be moved to closed condition, a circuit for said resistance element adapted to be established through said first contact elements upon engagement of said third contact elements and to be broken when the first contact elements become disengaged, a circuit for said second electrically operated valve adapted to be established through said third contact elements upon engagement of said second contact elements while either said first selective switch or said second selective switch is closed and to become broken when the third contact elements become disengaged, a circuit for said third electrically operated valve adapted to be established through the third contact elements upon engagement of said contact elements while said first selective switch is closed and to become broken when said third contact elements become disengaged, and a circuit for said fourth electrically operated valve adapted to be established through said third contact elements upon engagement of the second contact elements while said second selective switch is closed and to become broken when the third contact elements become disengaged.

13. The combination as specified in claim 12, fifth and sixth connections between said first and second receiving vessels, respectively, and said chamber, normally closed fifth and sixth electrically operated valves for controlling passage of the liquid substance by way of said fifth and sixth connections from said first and second receiving vessels, respectively, to said chamber, said fifth and sixth electrically operated valves being in circuits controlling said third and fourth electrically operated valves, respectively, an electric motor for causing the liquid substance to be pumped through said fifth connection when the third and fifth electrically operated valves are open and through said sixth connection when the fourth and sixth electrically operated valves are open from said first and second receiving vessels, respectively, to the chamber, and a circuit for said electric motor adapted to be established through said third contact elements while either said first selective switch or said second selective switch is closed and to become broken when the third contact elements become disengaged.

RICHARD D. HOTVEDT.

REFERENCES CITED

The following references are of record in the file of this patent:

UNITED STATES PATENTS

| Number | Name | Date |
|---|---|---|
| 411,037 | Jones | Sept. 17, 1889 |
| 941,009 | Cauchois | Nov. 23, 1909 |
| 1,603,130 | McDuffie | Oct. 12, 1926 |
| 1,805,159 | Bauer et al. | May 12, 1931 |
| 1,822,433 | Brand | Sept. 8, 1931 |
| 1,869,720 | Strand | Aug. 2, 1932 |
| 2,067,918 | Harper | Jan. 19, 1937 |
| 2,049,981 | Fromwiller | Oct. 5, 1937 |
| 2,450,177 | Allen | Sept. 28, 1948 |
| 2,493,932 | Swanson | Jan. 10, 1950 |